No. 872,282. PATENTED NOV. 26, 1907.
G. F. GEB.
EXPANSION PULLEY.
APPLICATION FILED FEB. 1, 1906.
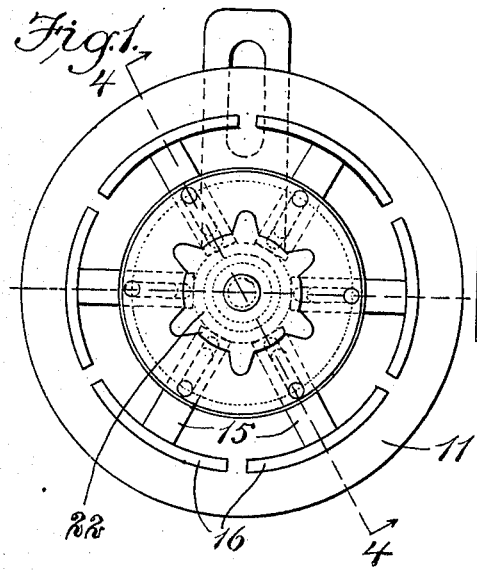
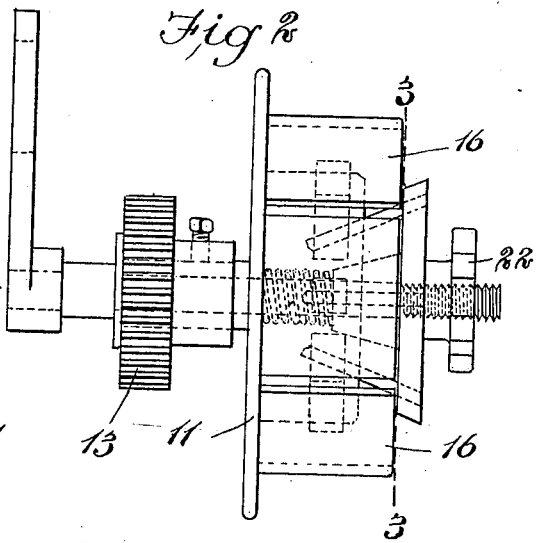
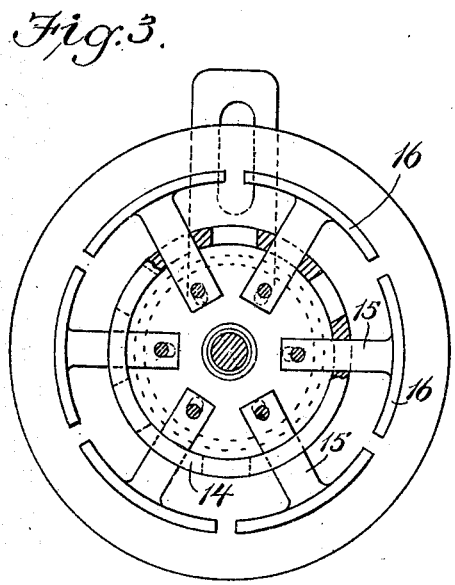
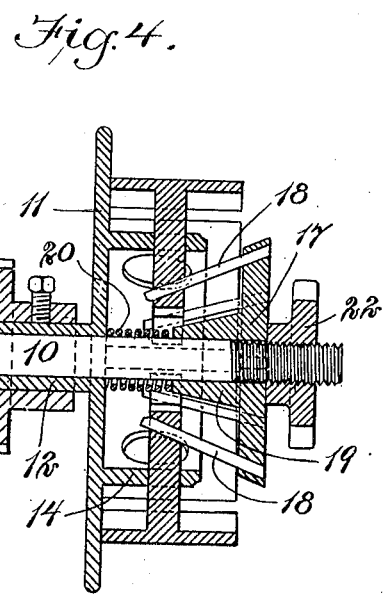
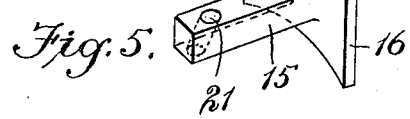
Witnesses:
H. Brown
C. C. Stecher
Inventor.
George F. Geb.
by
Attys

UNITED STATES PATENT OFFICE.

GEORGE F. GEB, OF FRANKLIN, MASSACHUSETTS.

EXPANSION-PULLEY.

No. 872,282.　　　Specification of Letters Patent.　　　Patented Nov. 26, 1907.

Application filed February 1, 1906. Serial No. 298,952.

*To all whom it may concern:*

Be it known that I, GEORGE F. GEB, of Franklin, in the county of Norfolk and State of Massachusetts, have invented certain new and useful Improvements in Expansion-Pulleys, of which the following is a specification.

This invention has relation to expansible pulleys, in which the belt receiving portion or periphery of the pulley is divided into radially adjustable segments.

The object of the invention is to provide certain improvements in pulleys of this character, which are illustrated upon the accompanying drawings, described in the following specification and pointed out in the appended claims.

Referring to the drawings,—Figure 1 shows in front elevation a pulley provided with my improvements. Fig. 2 represents a side elevation of the same. Fig. 3 represents a section on the line 3—3 of Fig. 2. Fig. 4 represents a section on the line 4—4 of Fig. 1. Fig. 5 represents in detail one of the segments or sections of the pulley.

On the said drawings, 10 indicates a stationary or non-rotatable shaft or arbor which is supported by any convenient means on the machine of which the pulley is to form a part. The pulley, which is loosely journaled upon this arbor, comprises a disk 11, the hub 12 of which is journaled loosely on the arbor 10. Upon the said hub 12 is secured a gear 13 or other power transmitting member by which the rotation of the pulley is transmitted to some operative portion of the machine. The disk 11 is provided with an annular flange 14 which extends in the direction of its axis and which serves as a guide for a plurality of arms 15 which are arranged radially with relation to said flange 14 and arbor 10, and which carry on their outer ends segments 16 forming the belt-receiving portion of the pulley. The segments 16 bear at the inner edges against the outer face of the disk 11, so that, although they are adjustably radial of the arbor 10, nevertheless they are held against independent rotation. To effect the radial adjustment of said segments simultaneously, I employ a member 17, having a series of fingers 18, all arranged at equal acute angles to the axis of the arbor 10. The member 17 consists of a disk which is loosely journaled on the arbor 10 and is provided with an elongated hub 19, between the inner end of which and the outer face of the disk 11 is a coiled expansion spring 20.

The member 17 is preferably of cast metal, whereas the fingers 18 are formed of rods, about the ends of which the said member 17 is cast in its formation. The said rods or fingers 18 are supported only at their outer ends, their inner ends being free, whereby they may be inserted into inclined apertures 21 in the bars or arms 15. Each finger 18 therefore constitutes as it were a wedge, so that, when the member 17 is adjusted in the direction of the axis of the arbor 10, it will move one of the pulley sections radially outward or inward as the case may be. The outer end of the arbor 10 is threaded to receive a hand nut 22, the inner end of which bears against the outer face of the member 17. The spring 20, which bears against the end 19 of the member 17, holds it against the nut so that, by rotating said nut in one direction or the other, the member 17 with its inclined fingers 18, may be adjusted outward or inward as desired. In connection with the nut 22, I may use a lock-nut (not shown) if desired.

A decided feature of advantage of the device thus described as embodying the invention is, that the segments 16 are adjusted positively outward or inward by the axial movement of the member 17; and the fingers 18, being engaged directly with the bars 15, hold said bars in any position to which they may be adjusted. Again, inasmuch as the inner ends of the fingers are free, the member 17 carrying the fingers may be easily removed and disengaged from the pulley sections so as to permit of their being cleaned or repaired and the parts may be reassembled with facility.

Having thus explained the nature of the invention, and described a way of constructing and using the same, although without attempting to set forth all of the forms in which it may be made, or all of the modes of its use, I declare that what I claim is:

An expansion pulley, comprising a plurality of pulley sections, each having a radially arranged arm and a segment at the end thereof, a disk having an annular flange apertured to receive and guide said arms, an arbor on which said disk is journaled, and means for effecting a radial adjustment of said sections consisting of an axially sliding member having a series of fingers arranged at an inclination to the axis of said pulley, the free ends of said fingers being inserted in inclined apertures in said arms, and a nut threaded on said arbor for effecting an axial adjustment of said member.

In testimony whereof I have affixed my signature, in presence of two witnesses.

GEORGE F. GEB.

Witnesses:
 GEO. L. VESIR,
 WILLIAM A. WYCKOFF.